June 20, 1967  E. J. SCHAEFER  3,327,167
ELECTRICAL DETECTING SYSTEM
Filed June 30, 1964  5 Sheets-Sheet 1
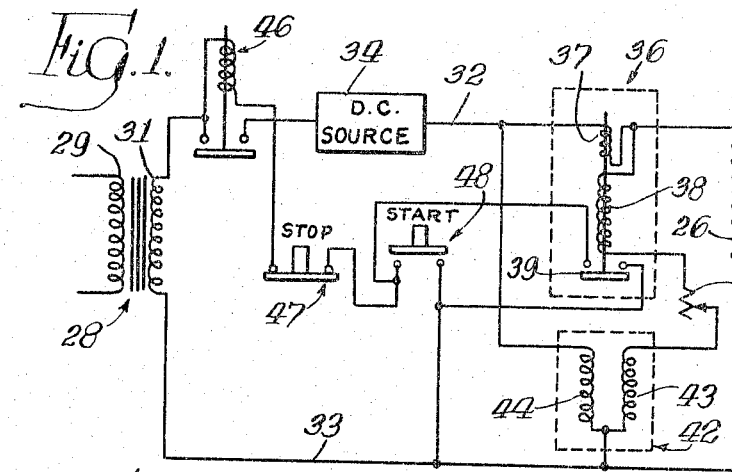
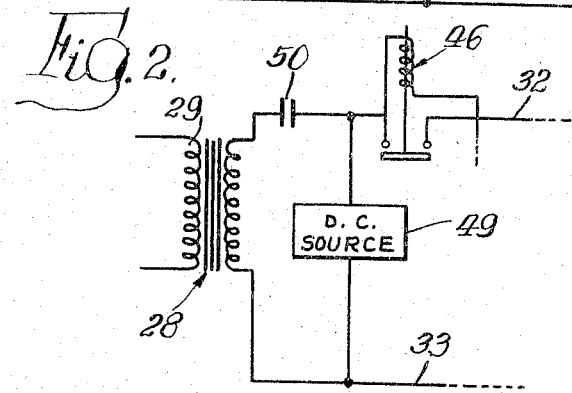
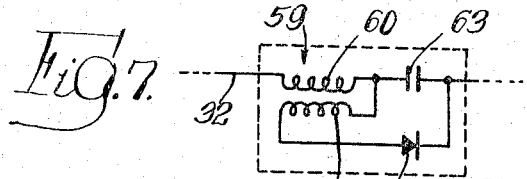
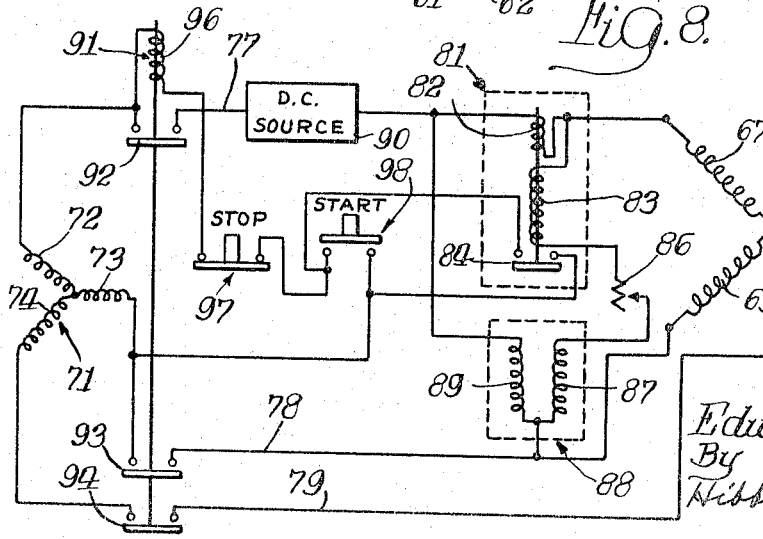
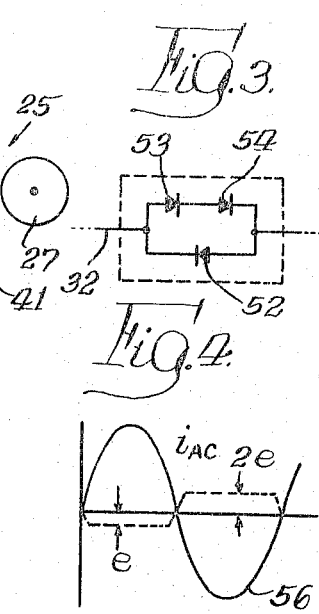
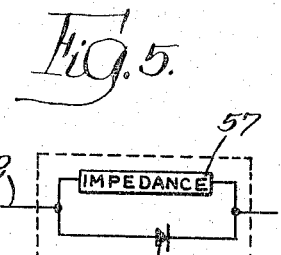
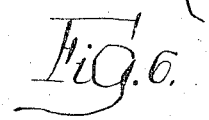
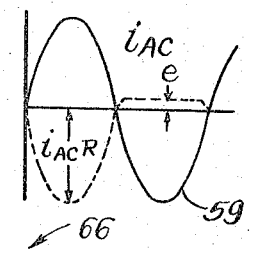
Inventor:—
Edward J. Schaefer,
By
Hibben, Noyes & Bicknell
Attys.

INVENTOR.
Edward J. Schaefer,
BY
Hibben, Noyes & Bicknell
Attys.

June 20, 1967        E. J. SCHAEFER        3,327,167
ELECTRICAL DETECTING SYSTEM
Filed June 30, 1964        5 Sheets-Sheet 3
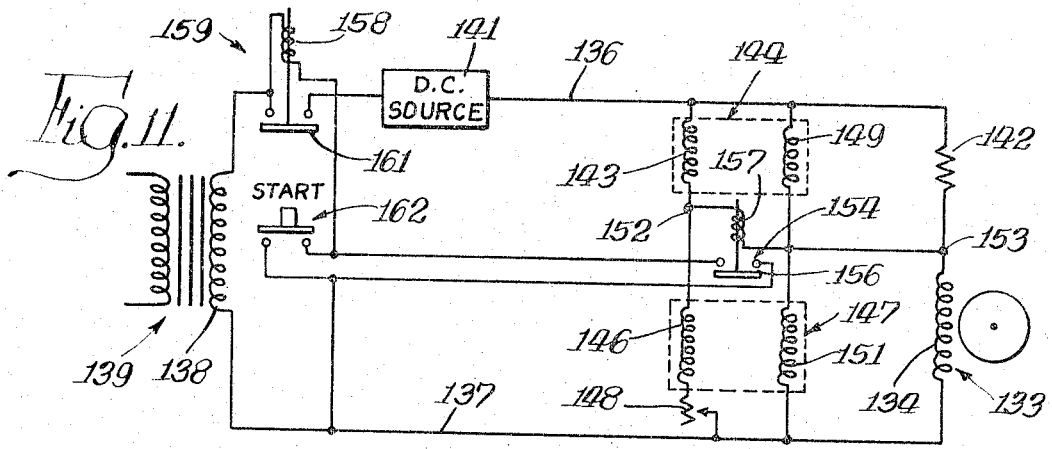
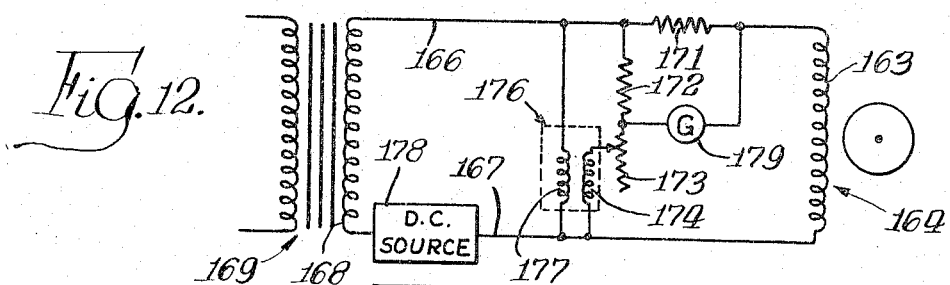
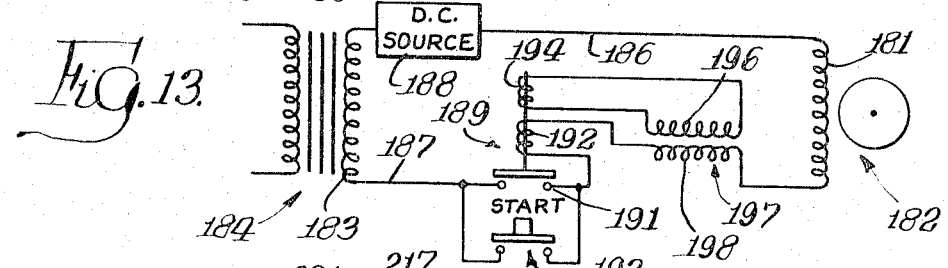
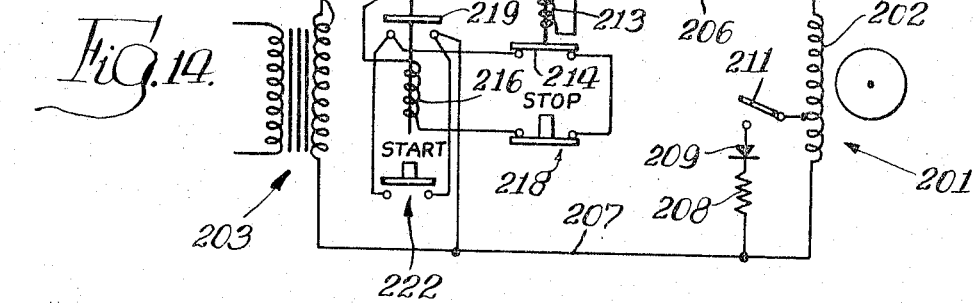
INVENTOR.
Edward J. Schaefer,
BY Hibben, Noyes & Bicknell
Attys.

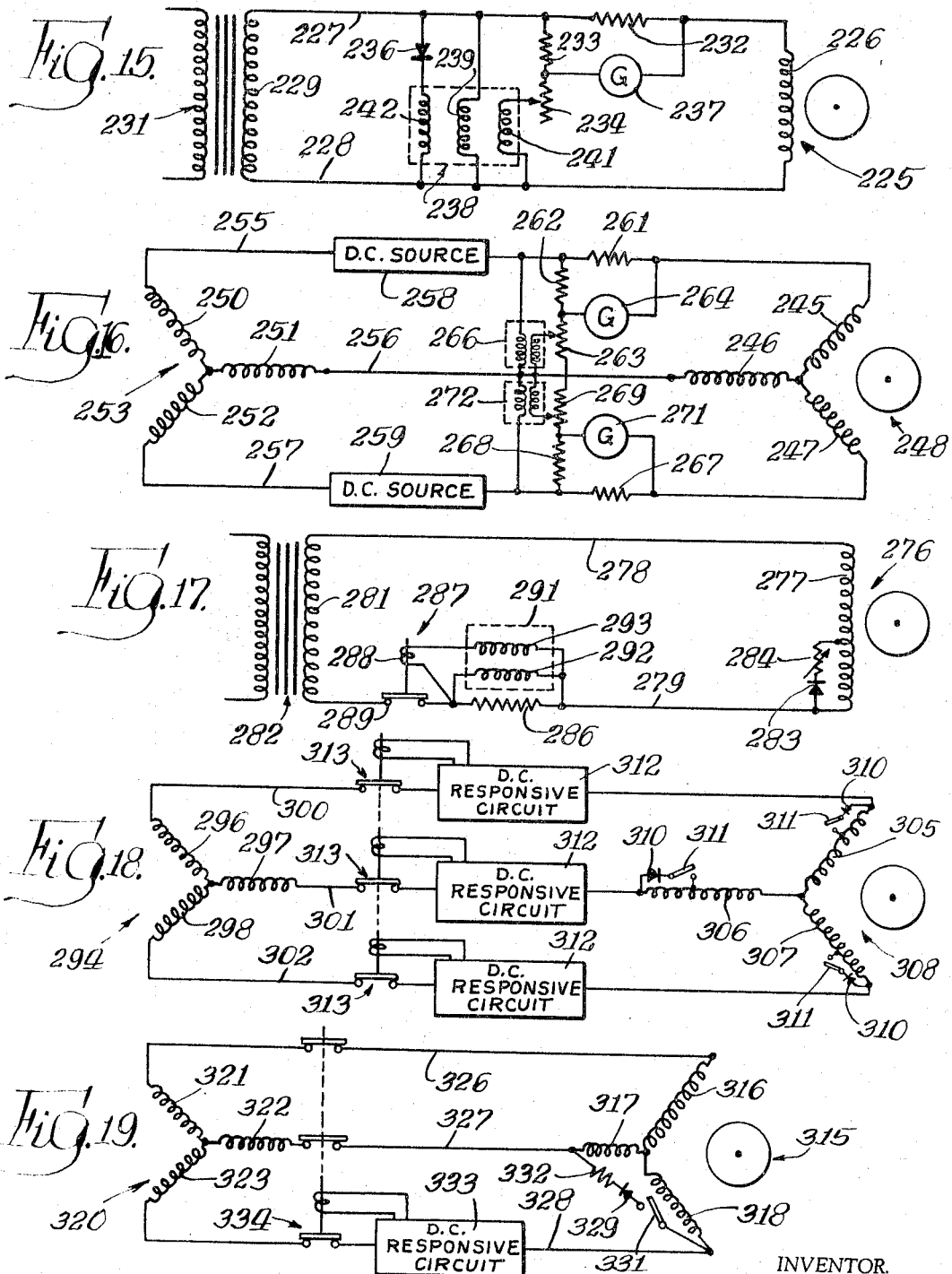

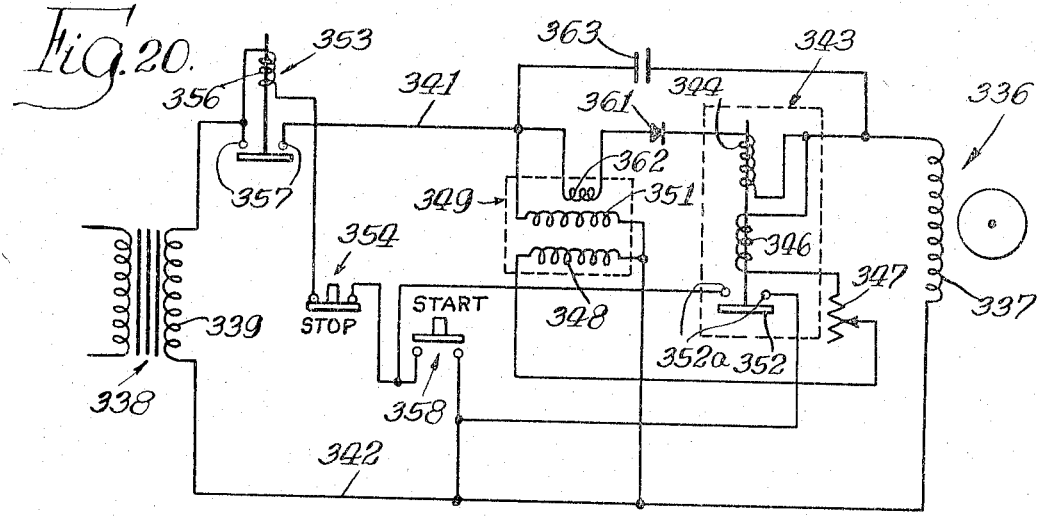
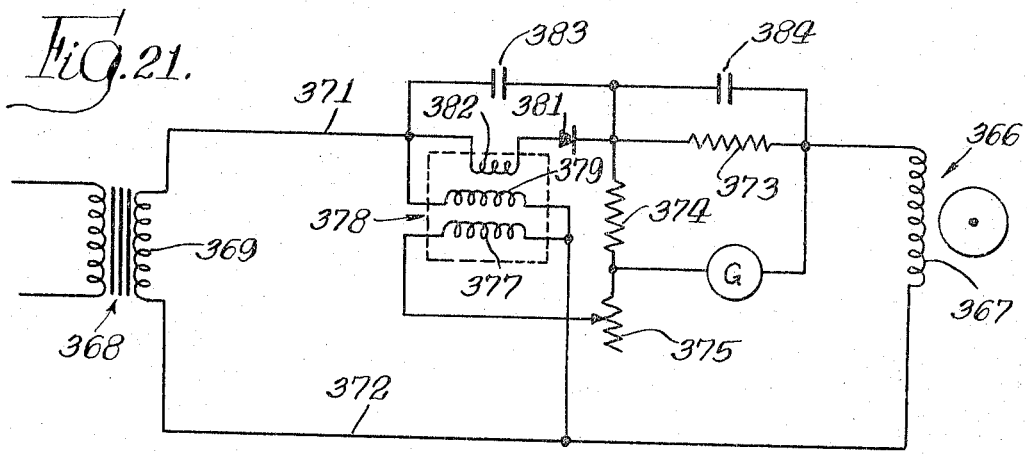
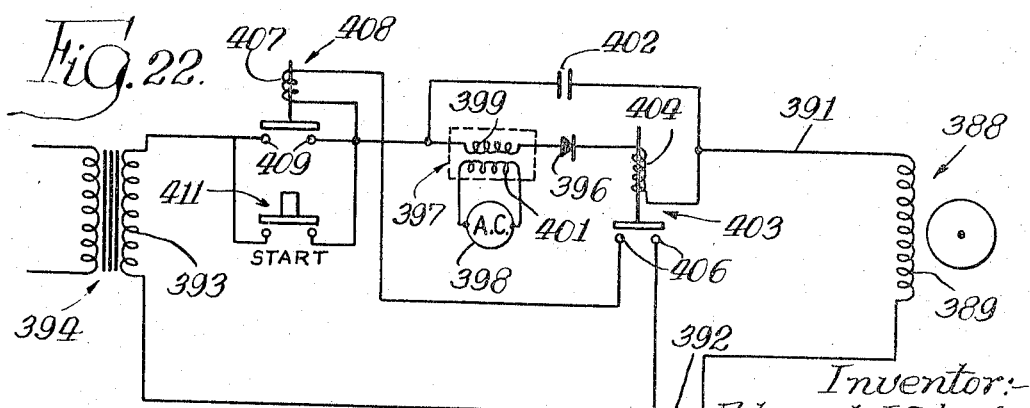

United States Patent Office

3,327,167
Patented June 20, 1967

3,327,167
ELECTRICAL DETECTING SYSTEM
Edward J. Schaefer, Bluffton, Ind., assignor to Franklin Electric Co., Inc., Bluffton, Ind., a corporation of Indiana
Filed June 30, 1964, Ser. No. 379,117
48 Claims. (Cl. 317—13)

This invention relates to electrical detecting circuits, and more particularly to means for measuring or detecting a change in the resistance and the temperature of energized alternating current apparatus.

Since the resistance of an electrical conductor is usually a function of its temperature, it has been proposed to measure the temperature of such a conductor by passing electrical current through it and measuring its resistance. When the resistance of the conductor at a given temperature and its temperature coefficient of resistance are known, the temperature of the conductor may be calculated after its resistance has been measured. A circuit based on this principle has been proposed for determining the temperature of an electrical apparatus, such as a motor or transformer, while the apparatus is energized by alternating current. A circuit as described which may be operated continuously would be very advantageous since it could be used in conjunction with a pump-motor, for example, in an oil well, and give a continuous indication of motor temperature or disconnect the motor from its power supply at excessively high temperatures, or both.

Accordingly, a primary object of this invention is to provide an improved detecting circuit adapted for continuous operation with energized operation with energized alternating current apparatus and adapted to detect the operating condition of the apparatus.

It is another object to provide novel means for measuring the resistance of energized alternating current apparatus.

Still another object is to provide novel means for automatically disconnecting an apparatus from an alternating current power supply when its temperature rises to an excessively high value.

A further object is to provide apparatus of the foregoing character, including means for deriving a direct current component from the alternating current utilized in the apparatus.

A still further object of the invention is to provide novel means for deriving a direct current component from alternating current.

Other objects and advantages of the invention will become apparent from the following detailed description taken in conjunction with the accompanying figures of the drawings, in which:

FIG. 1 is a schematic illustration of a detecting circuit embodying the invention;

FIG. 2 shows a modified form of a portion of the circuit shown in FIG. 1;

FIG. 3 shows a circuit for introducing direct current into the circuit of FIG. 1;

FIG. 4 is a curve illustrating the operation of the circuit shown in FIG. 3;

FIG. 5 shows another circuit for introducing direct current into the circuit of FIG. 1;

FIG. 6 is a curve illustrating the operation of the circuit shown in FIG. 5;

FIG. 7 shows still another circuit for introducing direct current into the circuit of FIG. 1; and FIGS. 8 to 22 are schematic illustrations of other detecting circuits embodying the invention.

Figure 9:
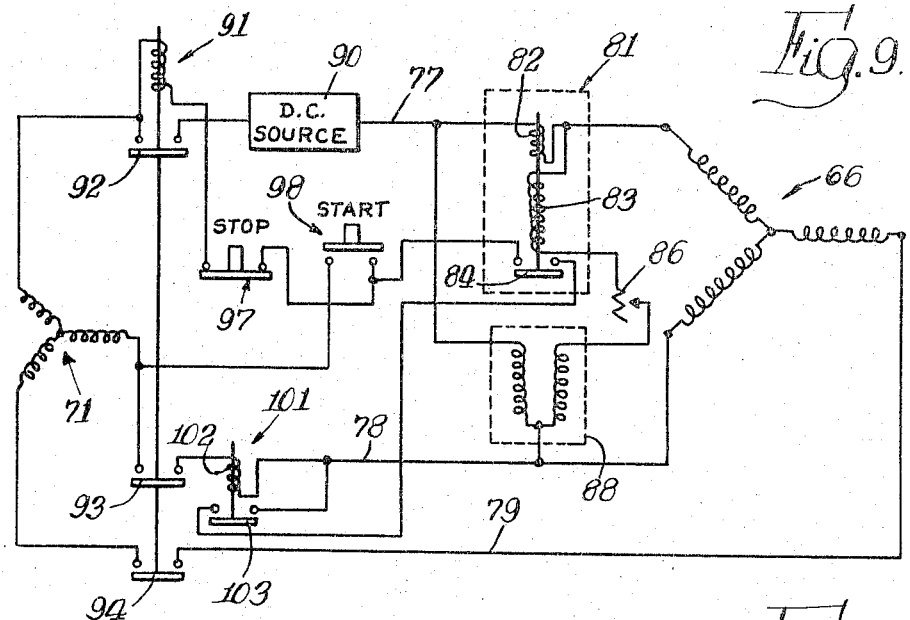

In general, a detecting circuit embodying the invention is adapted to be connected in a power system including an alternating current apparatus and an alternating current power supply connected to the apparatus by power lines, and to measure the direct current resistance of the apparatus or disconnect the apparatus from the power supply in the event the temperature of the apparatus rises to an excessively high value. The circuit comprises means for causing direct current to flow through at least a portion of the apparatus and at least a portion of one of the power lines, the flow of direct current depending upon the temperature of the apparatus. The circuit further comprises direct current responsive means having at least a portion serially connected in said portion of one of the power lines, whereby direct current flowing through the apparatus and said portion of the power line also flows through said portion of the direct current responsive means and is detected thereby.

The direct current responsive means may further comprise another portion connected to be responsive to a direct current voltage drop existing due to direct current flowing through said portion of the apparatus.

The detecting circuit may be such that it responds to the presence or absence of direct current or it may respond to a decrease or increase in the direct current. In the claims, where direct current responsive means for detecting the flow of direct current is referred to, it is intended to cover all of the foregoing situations.

In greater detail, FIG. 1 shows a system comprising an alternating current apparatus 25 which may be a single phase motor, for example, having a winding 26 and a rotor 27. Also shown is an alternating current power supply 28 which may comprise a power distribution transformer including a primary winding 29 and a secondary winding 31, the latter winding 31 being connected by two power lines 32 and 33 to the motor winding 26. A direct current source 34 is connected in the power line 32, for example, and causes direct current to flow through the loop formed by the power lines 32 and 33 and the windings 26 and 31 simultaneously with alternating current.

The system further includes a direct current responsive means comprising a differential polarized relay 36 having a current coil 37, a potential coil 38 which has more turns than the current coil 37, and switch contacts 39. The current coil 37 is connected in the power line 32 and, therefore, direct current flowing through the apparatus winding 26 also flows through the current coil 37. The potential coil 38 is made responsive to the direct current voltage drop across the apparatus winding 26 by connecting the coil 38 in parallel with the winding 26. The potential coil 38 is connected in series with a variable resistor 41, which permits variation of the amount of direct current flowing through the coil 38, and in series with the secondary winding 43 of an equalizing transformer 42 which prevents alternating current from flowing through the potential coil 38. The primary winding 44 of the transformer 42 is connected across the power lines 32 and 33 and induces a voltage in the secondary winding 43 which is equal in magnitude and opposite in phase to the alternating current voltage across the apparatus winding 26, and, therefore, prevents alternating current from flowing through the coil 38. The current coil 37 is wound to urge the relay contacts 39 to the closed position and the potential coil 38 is wound to urge the contacts 39 to the open position which is also the normal position of the relay 36 with power off.

A normally open relay 46 has its contacts connected in the power line 32. Its coil is connected across the power lines 32 and 33 ahead of its contacts, and is connected in series with a normally closed stop switch 47 and the contacts 39 of the differential relay 36. Furthermore, a normally open start switch 48 is connected in parallel with the differential relay contacts 39 to permit starting of the system.

To energize the apparatus 25, the start switch 48 is momentarily closed, which permits alternating current to flow from the transformer winding 31, through the power line 32, the coil of the relay 46, the normally closed stop switch 47, the start switch 48, and the other power line 33. The contacts of the relay 46 close and permit alternating current to flow through the direct current source 34, the current coil 37 of the relay 36 and the apparatus winding 26. The differential relay 36 is a polarized type, and therefore alternating current flowing through the current coil 37 will not affect its movable element. However, the direct current developed by the source 34 flowing through the current coil 37 exerts a force on the movable element and causes the contacts 39 to close. The relay 46 is then energized through the contacts 39 and the start switch 48 may be released. Thereafter the apparatus 25 will continue to be energized until either the stop switch 47 is opened or the differential relay contacts 39 open.

Under normal operating conditions, direct current from the source 34 flows through the current coil 37 and the apparatus winding 26, and the direct current voltage drop due to the resistance R of the apparatus winding 26 causes direct current to flow through the potential coil 38. The turns of the coils 37 and 38 are proportioned so that the current coil 37 is stronger than the potential coil 38, the relay torque is positive, and the contacts 39 are closed.

The torque T of the differential relay may be expressed by the equation:

$$T = C_1 I_{DC} - C_2 E_{DC} \qquad (1)$$

where $C_1$ and $C_2$ are constants determined by the turns of the coils 37 and 38, respectively, and the magnetic characteristics of the circuit. $I_{DC}$ is the direct current flowing through the apparatus winding 26, and $E_{DC}$ is the voltage drop across the winding 26. Since $E_{DC}$ is equal to $I_{DC}R$, equation 1 may be rewritten as:

$$T = C_1 I_{DC} - C_2 I_{DC} R \qquad (2)$$
$$= I_{DC}(C_1 - C_2 R) \qquad (3)$$

The relay contacts 39 open when T equals zero which occurs when $C_1$ equals $C_2R$. If $C_2R$ should become greater than $C_1$ before the relay contacts 39 open, this condition will help to open the contacts. Thus, when the current coils 37 strength predominates, the torque T is positive and in the direction to close the contacts 39, and when the potential coil 38 strength predominates the torque T is negative and tends to open the contacts 39. The variable resistor 41 is adjusted so that $C_2R$ is normally less than $C_1$, and the value of R will increase to the point where $C_1 = C_2R$ only when the winding 38 is overheated. When this occurs, the contacts 39 open, which action deenergizes the relay 46 and disconnects the power supply 28 from the apparatus 25. The start switch 48 must be closed to again energize the apparatus 25. The apparatus 25 may also be deenergized at any time during operation by opening the stop switch 47.

It may be noted by reference to the above equations that the point of zero torque, or in other words, the point at which the torque reverses and the contacts 39 open, is entirely independent of the amount of direct current flowing in the system. The contacts 39 open at a null condition, that is, when the force exerted by the current coil 37 equals the force exerted by the potential coil 38, rather than when a predetermined amount of direct current is flowing in the system. Consequently, the direct current source 34 need not have a constant voltage, and any changes in the amount of direct current flowing due to changes in the resistance of the power supply 28 or other components in the system may be neglected.

FIG. 2 illustrates an alternative method of introducing direct current into the system shown in FIG. 1. In place of the direct current source 34 (FIG. 1), there is substituted a direct current source 49 which is connected across the power lines 32 and 33 ahead of the relay 46, and a capacitor 50 which is connected in one of the power lines 32 and 33 ahead of the direct current source 49. In operation, direct current from the source 49 flows through the power lines 32 and 33 through the direct current responsive means in the manner previously explained. Direct current does not flow through the alternating current supply winding 31, however, due to the capacitor 50. The capacitor 50 may be of the electrolytic type and may have a very high microfarad rating so that it passes alternating current with a very small voltage drop across it.

The direct current source 34 and the source 49 may comprise a battery. Since some types of batteries may be harmed by continuous passage of alternating current through them, it is preferred that a source of the type shown in FIGS. 3, 5 and 7 be used in the system shown in FIG. 1. In FIG. 3, three substantially identical rectifiers 52, 53 and 54 are provided, the rectifier 52 being in one of two parallel branches and the rectifiers 53 and 54 being serially connected in the other parallel branch. The polarity of rectifier 52 is such that it passes current in one direction and the polarity of the rectifiers 53 and 54 is such that they pass current in the opposite direction. Solid state rectifiers of the germanium or solicon type are preferred because they have a substantially constant forward voltage drop across them regardless of the amount of current flowing through them. In FIG. 4, the curve indicated by the numeral 56 represents alternating current from the supply 28. During the first half cycle, current flows through the branch containing the rectifier 52 and a voltage drop equal to e occurs. During the second half cycle, current flows through the branch containing the two rectifiers 53 and 54 and a voltage drop equal to 2e occurs. The two voltage drops e and 2e have opposite polarity and the net voltage drop across the two parallel branches will be the difference between the two voltage drops. This difference is a pulsating direct current voltage, each pulse having a duration of one half cycle and an amplitude substantially equal to e. This direct current component causes a direct current voltage drop across the apparatus 25 and it is sufficient to actuate the relay 36.

In FIG. 5, an alternating current impedance 57, such as a resistor, an inductor or a capacitor, or a combination of a capacitor or an inductor with a resistor, is connected in one of two parallel branches, and a rectifier 58 is connected in the other parallel branch. In FIG. 6, the curve 59 represents alternating current from the supply 28. During one half cycle of alternating current, current will flow only through the branch containing the impedance 57 and a voltage drop substantially equal to $i_{ac}R$ occurs. During the other half cycle, current flows through both branches but the voltage drop is substantially equal to e, the drop across the rectifier 58. The net average direct current voltage is approximately equal to one-half the difference between these two voltage drops.

The direct current source shown in FIG. 7 comprises a current transformer 59 having primary and secondary windings 60 and 61, a rectifier 62, and a capacitor 63. The primary winding 60 and the capacitor 63 are connected in series in the power line 32, and the secondary winding 61 and the rectifier 62 are connected in series and are connected across the capacitor 63. Alternating current flowing through the power line 32 and the primary winding 60 induces a voltage in the secondary winding 61 which is rectified by the rectifier 62. The direct current component of the rectified voltage is forced by the capacitor 63 to flow through the apparatus 25, the relay 36, and the power supply 28. The capacitor 63 again preferably has a high microfarad rating so that the alternating current voltage drop across it is very small.

The amount of direct current produced by the sources shown in FIGS. 3, 5 and 7 depends upon the amount of alternating current flowing through them, which of course varies with the amount of load on the apparatus 25. As previously explained, a direct current variation does not affect the operation of the relay 36 because it operates at a null condition. In fact, such a variation may be advantageous because more direct current flows and the relay 36 may be more sensitive under heavy load conditions.

FIG. 8 illustrates an arrangement similar to that shown in FIG. 1, but applied to a polyphase system. The system includes an apparatus 66 having three phase windings 67, 68 and 69, a three phase power supply 71 having windings 72, 73 and 74, and three power lines 77, 78 and 79. The direct current responsive means again includes a differential relay 81 having a current coil 82, a potential coil 83, and a movable member 84 having contacts, the current coil 82 being connected in the power line 77 and the potential coil 83 being connected across the two windings 67 and 69 of the apparatus 66. A variable resistor 86 and the secondary winding 87 of an equalizing transformer 88 are again connected in series with the potential coil 83. The primary winding 89 of the equalizing transformer 88 is connected across the power lines 77 and 78 and induces a blocking voltage in the branch containing the potential coil 83. A direct current source 90, which may comprise one of the sources previously described, is connected in the power line 77.

A relay 91 having three sets 92, 93 and 94 of normally open contacts is also provided, one set of contacts being connected in each of the power lines 77 to 79. The coil 96 of the relay 91 is connected across the power lines 77 and 78 ahead of its contacts in the lines 77 and 78, and in series with a normally closed stop switch 97 and the normally open contacts of the movable member 84 of the differential relay 81. A normally open start switch 98 is again connected in parallel with the contacts of the movable member 84 of the differential relay 81 in order to start operation of the system.

This system will detect a change in resistance of the winding 67 which is serially connected with each of the windings 68 and 69, these three windings have an equivalent resistance of $3/2\ R_e$, where $R_e$ is the resistance of any one of three windings 67 to 69.

This circuit will function substantially the same as circuit shown in FIG. 1 and will cause the relay 81 to open the power lines in the event the temperature of the apparatus windings rises to an unsafe value. In the event the power line 77 opens on either the power supply 71 side or the apparatus 66 side of the differential relay 81, the direct current component generated by the source 90 will disappear. This will cause the torque of the differential relay 81 to fall to zero with the result that the contacts of the movable member 84 will open and deenergize the relay 91. In the event the power line 78 opens on the apparatus 66 side of the differential relay 81, no direct current will flow through the apparatus winding 69. Therefore, the resistance measured will be $2R_e$ rather than $3/2\ R_e$, which will cause the differential relay 81 to open since this will normally be a greater increase in resistance than that against which this relay is set to protect. Further, if this were not enough resistance to cause the differential relay to open immediately, it would open eventually due to overheating of windings 67 and 68 caused by single phase operation. In the event the power line 79 opens, the equivalent resistance measured by the protection circuit will again be $2R_e$ rather than $3/2\ R_e$ which would cause the differential relay 81 to open as previously described in relation to the power line 78.

In the event the power line 78 opens on the power supply 71 side of the protection circuit, the differential relay 81 may not open since the current coil 82 would still predominate and by an increased amount so that overheating caused by single phase operation may not be sufficient to trip the differential relay 81. The circuit illustrated in FIG. 9 is therefore provided to give added protection in the event this latter circumstance occurs.

The circuit shown in FIG. 9 is generally similar to that shown in FIG. 8 and the same reference numerals are used to indicate corresponding components. The only difference between the two circuits is the addition of a current sensitive relay 101 having its coil 102 connected in the power line 78 between the contacts 93 of the relay 91 and the apparatus 66. The contacts 103 of the relay 101 are connected in series with the contacts of the movable member 84 of the differential relay 81 so that, while the system is operating, the relay 91 will be deenergized if either the contacts of the movable member 84 of the differential relay 81 open or the relay 101 is deenergized. Accordingly, the apparatus 66 will be disconnected from the power supply 71 in the event any of the conditions outlined with regard to FIG. 8 occur and, in addition, in the event the power line 78 opens on the power supply 71 side of the protection system. In this event the potential coil direct current voltage of the differential relay 81 would drop to approximately one-half value and the differential relay would remain closed and fail to protect in case of overheating. In this latter event current flow through the coil 102 will cease and the contacts 103 will open. Therefore, protection against any abnormal condition causing overheating or a line failure will be obtained when using the system shown in FIG. 9.

Figure 10:
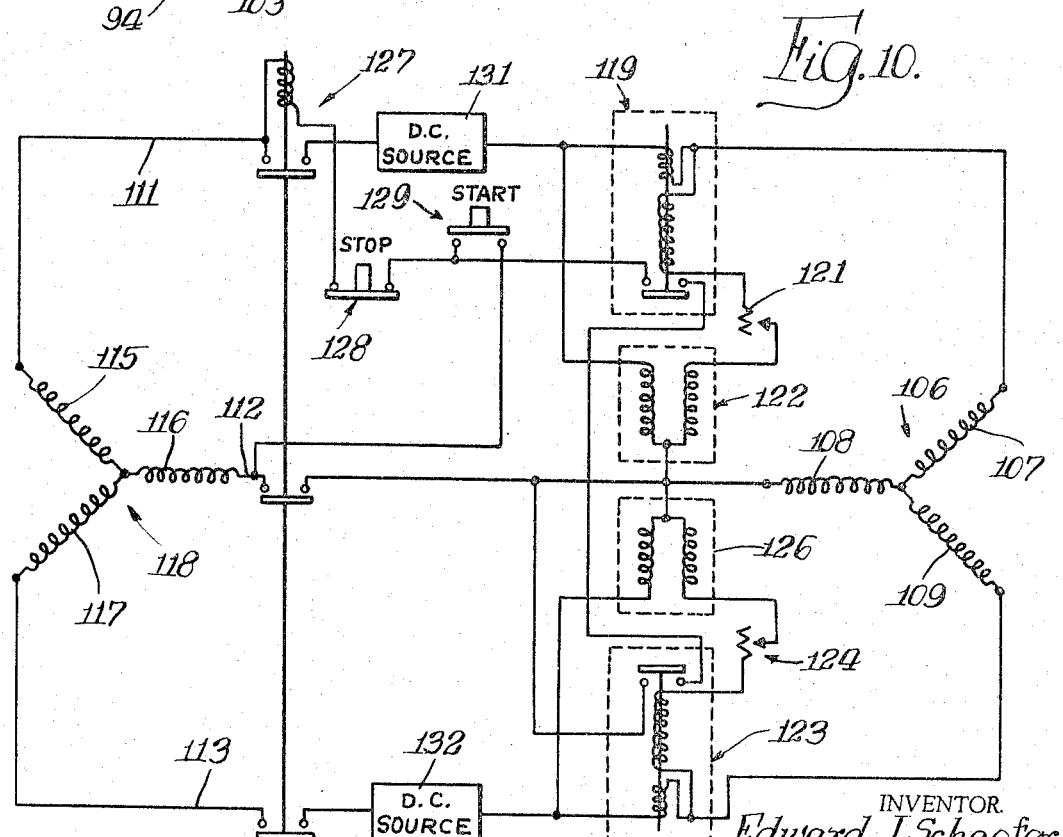

FIG. 10 illustrates a circuit employing two similar differential relay circuits for protecting a three phase system. An apparatus 106 comprises three phase windings 107, 108 and 109 connected by three power lines 111, 112 and 113 to three windings 115, 116 and 117 of a three phase power supply 118. A differential relay 119 has its current coil connected in the power line 111 and its potential coil connected across the power lines 111 and 112 and in series with a variable resistor 121 and the secondary winding of an equalizing transformer 122. The primary winding of the transformer 122 is connected across the power lines 111 and 112 in order to prevent alternating current from flowing through the potential coil of the differential relay 119. The other differential relay circuit is similar and includes another differential relay 123, a variable resistor 124 and an equalizing transformer 126 connected in the power lines 112 and 113. A relay 127 having a set of normally open contacts connected in each of the power lines 111, 112 and 113 has its coil connected across the power line 111 and 112 in order to prevent alternating current from flowing through the potential coil of the differential relay 119. The other differential relay circuit is similar and includes another differential relay 123, a variable resistor 124 and an equalizing transformer 126 connected in the power lines 112 and 113. A relay 127 having a set of normally open contacts connected in each of the power lines 111, 112 and 113 has its coil connected across the power lines 111 and 112 and in series with a stop switch 128 and the contacts of the two differential relays 119 and 123. Thus, the relay 127 will be deenergized and open the power lines if either of the two differential relays 119 and 123 trips. A start switch 129 is again connected in parallel with the contacts of the two differential relays 119 and 123 to permit initial energization of the system, and direct current sources 131 and 132 are connected in the power lines 111 and 113 respectively, with their polarities arranged such that the direct current in the power line 112 is the difference between the currents from the two sources 131 and 132.

After the system shown in FIG. 10 has been started by closing the start switch 129, direct current flows through the power lines 111 and 113, but substantially no direct current flows through the power line 112 and the windings 108 and 116 because they are connected between substantially equipotential points. Differential relay 119 will then indicate the resistance of winding 107 and differential relay 123 will indicate the resistance of winding 109. Except on unbalanced resistance conditions, a change of resistance of winding 108 will not register, but as long as three phase operation continues, any overheating of winding 108 will also heat windings 107 and 109 and cause one or both of the differential relays 119 and 123 to trip. In the event the power line 111 opens on the apparatus 106 side of the differential relay 119, the torque produced on both the current coil and the potential coil of this differential relay 119 will reduce to zero, and the relay 119 contacts will open and stop operation. If line 111 opens on the power supply 118 side of the differential relay 119 the torque produced by the current coil of the relay 119 will fall to zero and the torque produced by the potential coil which is normally in the direction to open its contacts, will reverse, with the result that the differential relay 119 will hold in. Under these conditions, however, if overheating of windings 108 and 109 occurs due to single phase operation, differential relay 123 will trip and stop operation.

If a power line 112 should open on the apparatus 106 side of the differential relays, the current coils of the two differential relays 119 and 123 will not be affected, and the potential coils of these two differential relays will divide the total voltage evenly and protect windings 107 and 109, which are then connected in series, in the normal manner. If power line 112 should open on the power supply 118 side of the differential relays, the two differential relays 119 and 123 will individually protect windings 107 and 109.

In the event power line 113 opens on the apparatus 106 side of the differential relays, operation will be similar to that described when power line 111 opens on the apparatus side of the differential relay 119, except that differential relay 123 will trip instead of relay 119. If the power line 113 should open on the power supply 118 side of the differential relays, operation will be the same as that described when power line 111 opens on the power supply 118 side of the differential relays, except that differential relay 123 will hold in and differential relay 119 will eventually trip due to overheating of windings 107 and 108.

FIG. 11 shows a system including a bridge circuit, the apparatus being protected forming one arm of the bridge. The system comprises an apparatus 133 having a single phase winding 134 which is connected by two power lines 136 and 137 to a winding 138 of an alternating current power supply 139. A direct current source 141 is connected in the power line 136.

The direct current responsive means comprises a bridge circuit having the apparatus winding 134 in one arm or branch, a resistor 142 in a second arm, the secondary winding 143 of an equalizing transformer 144 in a third arm, and the secondary winding 146 of another equalizing transformer 147 in the fourth arm of the bridge. A variable resistor 148 is connected in series with the winding 146 to vary the resistance of the fourth arm of the bridge. The two equalizing transformers 144 and 147 have primary windings 149 and 151 which are respectively connected in parallel with the resistor 142 and the apparatus winding 134. These primary windings 149 and 151 induce blocking voltages in the secondary windings 143 and 146 and prevent the flow of alternating current through them.

In accordance with well known bridge circuit theory, direct current from the source 141 flows through the branches containing the resistor 142 and the winding 134 and also through the branches containing the secondary windings 143 and 146 of the two equalizing transformers. If an unbalanced resistance condition exists between these branches, a potential difference appears between terminals 152 and 153, the terminal 152 being at the connection of the two secondary windings 143 and 146 and the terminal 153 being at the connection of the resistor 142 with the winding 134. A relay 154 having normally open contacts 156, has its coil 157 connected between the two terminals 152 and 153. When a potential difference between the two terminals 152 and 153 is sufficient, current flows through the relay coil 157 and causes the contacts 156 to close.

The contacts 156 of the relay 154 are connected in series with the coil 158 of a normally open relay 159 and across the power lines 136 and 137, so that the coil 158 will be energized by alternating current from the supply 139 when the contacts 156 are closed. The relay 159 has normally open contacts 161 connected in the power line 136 on the apparatus 133 side of the coil 158. Further, a normally open start switch 162 is connected in parallel with the contacts 156 of the relay 154 in order to start operation of the system.

The value of resistor 142 is much less than the direct current resistance of apparatus winding 134 (on the order of 2% or less), and the direct current resistances of the secondary windings 143 and 146 are proportioned to be in approximately the same ratio. However, the actual direct current resistances of the secondary windings 143 and 146 are preferably much higher than that of the resistor 142 and the winding 134. The primary windings 149 and 151 also have high direct current resistances as compared with the resistor 142 and winding 134, so that the resistances of the primary windings 149 and 151 may be ignored even though they are connected in parallel with the resistor 142 and the winding 134.

Under balanced conditions of the bridge, the ratio of the resistance of the resistor 142 to that of the winding 134 is equal to the ratio of the resistance of the winding 143 to the sum of the resistances of the winding 146 and the variable resistor 148. This is true since the presence of the primary windings 149 and 151 of the equalizing transformers may be ignored without significant error.

The variable resistor 148 is adjusted so that under normal operating conditions of the apparatus 133, the bridge is unbalanced and current flows through the coil 157. The relay 159 is therefore normally held energized and alternating current flows through the resistor 142 and the apparatus winding 134. When the direct current resistance of apparatus winding 134 rises, due to overheating, to a predetermined value, the bridge reaches a balanced condition and current flow through the relay coil 157 ceases. The contacts 156 then open and the relay 159 is deenergized, which disconnects alternating current power from the apparatus 133. The start switch 162 may later be closed to resume operation when the winding 134 has returned to its normal temperature and resistance.

In the arrangement shown in FIG. 11, the phase angle and the magnitude of the alternating current voltages across the secondary windings 143 and 146 will be as close as possible to the voltages appearing across the resistor 142 and the winding 134. Therefore, changes in the phase angle caused by the resistor 142 in the power system can have no effect; by using two equalizing transformers as shown, nearly exact duplicates of the voltages across the resistor 142 and the winding 134 will appear across the equalizing transformer windings. Therefore, undesirable alternating current voltages across the relay 154 are substantially eliminated. Another advantage of this arrangement is that, if harmonics of the alternating current voltage appear in the system, which may occur with some types of direct current sources, they will also be substantially blocked by the equalizing transformers 144 and 147 and not appear across the relay 154.

In the circuit shown in FIG. 12, a winding 163 of an apparatus 164, which may be a single phase motor, is connected by two power lines 166 and 167 to a winding 168 of a power supply 169. This circuit also includes a bridge, the winding 163 forming one arm of the bridge, a resistor 171 connected in the line 166 forming another arm of the bridge, and two resistors 172 and 173 forming the remaining two arms of the bridge. The two resistors 172 and 173 are connected in series across the power lines 166 and 167 and in series with the secondary winding 174 of an equalizing transformer 176. The primary winding 177 of the transformer 176 is also connected across the power lines 166 and 167 and induces an alternating current blocking voltage in the secondary winding 174.

A direct current source 178 is connected in the power line 167 and causes direct current to flow through the four arms of the bridge. A meter 179 such as a galvanometer is connected across the arms of the bridge, and when a direct current resistance unbalance exists between the arms of the bridge, direct current flows through the galvanometer 179 which gives a visual indication. Alternating current is prevented from flowing through the resistors 172 and 173 and through the galvanometer 179 by the equalizing transformer 176 and the resistor 173 is made variable so that the bridge circuit may be initially unbalanced, so that when a predetermined temperature is reached the galvanometer will read zero. Operation in this manner is advantageous because, at balanced bridge condition a variation in the amount of current flowing in the system will not affect the operation of the bridge. Variable resistor 173 may be calibrated such that, when it is adjusted to produce a zero galvanometer reading, its scale will indicate the resistance, and therefore the temperature, of the apparatus winding 163.

With reference to FIG. 13, the winding 181 of an apparatus 182 is connected to a winding 183 of a power supply 184 by two power lines 186 and 187. A direct current source 188 is connected in power line 186 and introduces a direct current component into the system.

The direct current responsive means comprises a sensitive relay 189 having normally open contacts 191 connected in the power line 187, and a coil 192 also connected in the power line 187. A start switch 193 is connected in parallel with the relay contacts 191 to permit starting the system. When the switch 193 is closed, alternating current and direct current flow through the windings 181 and 183 and through the relay coil 192. Direct current from the source 188 in the coil 192 causes the contacts 191 to close and hold the system energized after the start switch 193 is permitted to open. The contacts 191 will then remain closed under normal operating conditions, but if the temperature of the winding 181 increases, the value of the direct current will fall because of an increase in the total resistance of the system caused by an increase in resistance of the winding 181. When the direct current component is sufficiently small, the relay 189 opens and deenergizes the system. For this system, the direct current source 188 is preferably a constant voltage type.

To prevent alternating current flowing through the coil 192 from influencing the operation of the relay 189, the relay 189 is provided with a second coil 194 which is connected across the secondary winding 196 of a current transformer 197. The primary winding 198 of the transformer 197 is connected in the power line 187. The connections are such that the magnetomotive force of the relay coil 194 is opposite that of the coil 192, and the turns of the two coils are adjusted so that the magnetomotive force produced by the alternating current in the two coils 192 and 194 cancels out. Direct current does not flow through the coil 194, of course, so the magnetomotive force produced by the flow of direct current in the coil 192 is not canceled out.

In FIG. 14, an apparatus 201 comprises a winding 202, and a power supply 203 comprises a winding 204, the two windings 202 and 204 being connected together by two power lines 206 and 207. A direct current source comprises a resistor 208, a rectifier 209, and a normally open temperature sensitive switch 211. These components 208, 209 and 211 are connected in series with each other and across a portion of the apparatus winding 202. The switch 211 has a temperature sensitive element, such as a bimetallic element, positioned to be heated by the winding 202, and the switch 211 is open at normal operating temperatures. When the temperature of the winding 202 and the switch 211, which is positioned adjacent the winding 202, rises to a predetermined level, the switch 211 closes and during one half of each cycle of alternating current, current flows through the resistor 208. The resistance of the resistor 208 is different from that of the portion of the winding 202 connected in parallel with it, which causes a direct current component to flow though the system in the manner previously explained similar to that, for example, in FIG. 5.

The direct current responsive means comprises a relay 212 having a coil 213, which is connected in the power line 206, and a set of normally closed contacts 214. The relay 212 is sensitive only to the direct current component, and the contacts 214 open when direct current flows.

The coil 216 of another relay 217 is connected in series with the contacts 214, a normally closed push button stop switch 218, and a set of normally open contacts 219 of this relay 217, and these elements are connected across the power lines 206 and 207. The relay 217 has another set of normally open contacts 221 connected in the power line 206 in series with the coil 213, and a normally open start switch 222 is connected in parallel with the contacts 219.

When the start switch 222 is manually closed alternating current flows from the power line 206, through the coil 216, the normally closed stop switch 218, the relay contacts 214, the start switch 222, and the power line 207. Alternating current flow through the coil 216 causes the contacts 219 and 221 to close, and the apparatus winding 202 is then energized through the contacts 221 of the relay 217, so that the start switch 222 may be released. Since the coil 216 is connected across the power lines 206 and 207, the relay 217 remains energized during normal operation.

At normal operating temperatures, the switch 211 is open and direct current does not flow through the system. At a predetermined high temperature however the switch 211 closes and direct current flows through the coil 213 of the relay 212. This causes the contacts 214 to open and the coil 216 of the relay 217 to be deenergized, which opens the contacts 221 and the circuit through the apparatus winding 202. Operation may later be resumed after the winding 202 has cooled sufficiently to permit the switch 211 to open by again closing the start switch 222. Operation may be stopped at any time by opening the stop switch 218, which disrupts the circuit through the relay coil 216.

The circuits shown in FIGS. 13 and 14 are primarily protection circuits.

The circuit shown in FIG. 15 is somewhat similar to that shown in FIG. 12 and comprises an apparatus 225 including a winding 226 which is connected by two power lines 227 and 228 to a winding 229 of a power supply 231. The winding 226 of the apparatus 225 again forms one arm of a bridge network, the other three arms containing three resistors 232, 233 and 234. The resistor 232 is connected in the power line 227 and the two resistors 233 and 234 are serially connected across the power lines 227 and 228. A rectifier 236 is connected across the power lines 227 and 228 and causes a direct current component to flow through the bridge circuit, and a direct current meter such as a galvanometer 237 is connected in the bridge to indicate the magnitude of any resistance unbalance existing. The resistor 234 is preferably made variable so that, for example, it may be adjusted for bridge balance. When power is applied to the apparatus 225, any increase in temperature and resistance of the winding 226 will be indicated by the galvanometer 237. As explained with regard to FIG. 12, the resistor 234 may be calibrated in terms of the resistance of the winding 216 and provide accurate measurements when the bridge is balanced.

To prevent alternating current from flowing through the resistors 233 and 234 and the galvanometer 237, an equalizing transformer 238 having a primary winding 239 and two secondary windings 241 and 242 is provided. The primary winding 239 is connected across the power lines 227 and 228 and induces in the secondary winding 241 a voltage that bucks the voltage of the source 231 and keeps alternating current out of the resistors 233 and 234 and the galvanometer 237. The secondary winding 242 is connected in series with the rectifier 236 and its turns are adjusted so that the voltage induced in it is somewhat different from that of the power supply 231. Therefore some alternating current flows through it during one half of each cycle of alternating current because of the rectifier 236, and this develops a direct current component in the system as previously explained.

FIG. 16 shows another circuit similar to that shown in FIG. 12 but adapted for use with a polyphase system. The numerals 245, 246 and 247 indicate the three phase windings of an apparatus 248, and the numerals 250, 251 and 252 indicate the windings of a power supply 253. The apparatus windings 245 to 247 are connected to the power supply windings 250 to 252 by three power lines 255, 256 and 257.

A direct current source 258 is connected in the line 255 and causes a direct current component to flow through a first loop including the windings 245, 246, 251 and 250, and through the lines 255 and 256. Another direct current source 259 is connected in the line 257 and causes a direct current component to flow in a second loop including the windings 246, 247, 252 and 251, and through the power lines 256 and 257.

In the first loop is provided a bridge circuit including three resistors 261, 262 and 263 which form three arms of the bridge, the windings 245 and 246 forming the fourth arm of the bridge. A galvanometer 264 indicates any resistance unbalance in this bridge, and an equalizing transformer 266 is provided to prevent alternating current flow through the reistors 262 and 263 and the galvanometer 264. Similarly, in the second loop is provided a bridge network including three resistors 267, 268 and 269, the windings 246 and 247 and a galvanometer 271. Another equalizing transformer 272 is provided to prevent alternating current from flowing through this bridge. The galvanometer 264 will indicate the temperature of the apparatus windings 245 and 246 and the galvanometer 271 will indicate the temperature of the apparatus windings 246 and 247. The galvanometers 264 and 271, as in the case of the galvanometers 179 and 237 shown in FIGS. 12 and 15, are sensitive to direct current and not to alternating current.

The circuits shown in FIGS. 17, 18 and 19 are similar to those shown in FIGS. 13 and 14, and are primarily protection circuits. In FIG. 17, an apparatus 276 comprises a winding 277 connected by two power lines 278 and 279 to a winding 281 of a power supply 282. Connected in parallel with a portion of the apparatus winding 277 is a rectifier 283 and a temperature sensitive resistor 284 such as a thermistor. A characteristic of the thermistor 284 is that its resistance decreases very rapidly with an increase in temperature. For example, its resistance may be of the order $10^5$ ohms at 20° C. and only 10 ohms at 100° C. This thermistor 284 is preferably embedded in the apparatus 276 so that it is at substantially the same temperature as the winding 277. When the thermistor 284 is heated and passes appreciable current, the rectifier 283 connected in parallel with the portion of the winding 277 causes a direct current component to flow through the power lines 278 and 279 and through the windings 277 and 281 as previously explained.

The direct current responsive means comprises a resistor 286 connected in the line 279, and a sensitive normally closed relay 287. The coil 288 of the relay 287 is connected in parallel with the resistor 286, and its contacts 289 are connected in the line 279 in series with the resistor 286.

Current flowing through the lines 278 and 279 has a relatively large alternating current component and a relatively small direct current component, the magnitude of the direct current component depending upon the temperature and the resistance of the thermistor 284. Direct current flow in the line 279 causes a voltage drop to appear across the resistor 286, which voltage drop causes direct current to flow through the relay coil 288. The alternating current component is prevented from flowing through the coil 288, however, by an equalizing transformer 291 having a primary winding 292 and a secondary winding 293. The secondary winding 293 is connected in series with the relay coil 288, and the primary winding 292 is connected across the resistor 286 and induces an alternating current blocking voltage in the secondary winding 293, which prevents alternating current from flowing through the relay coil 288. Direct current flows through the coil 288, however, and when the temperature of the winding 277 and the thermistor 284 rises, sufficient direct current flows through the power lines 279 and 278 and through the relay coil 288 to open the relay contacts 289 and stop the flow of alternating current to the apparatus 276. The relay 287 is a latch-in type which will then remain open until manually reset.

FIG. 18 illustrates a somewhat similar circuit applied to a polyphase system. The alternating current power supply 294 comprises three windings 296, 297 and 298 connected by three power lines 300, 301, and 302 to the windings 305, 306 and 307 of an apparatus 308. A direct current source is provided for each apparatus winding, each source including a rectifier 310 and a normally open temperature sensitive switch 311 serially connected across a portion of each apparatus winding. Each switch 311, which may be a thermostatic bimetallic switch, is positioned to be heated by its associated apparatus winding, and, when it is heated sufficiently, it closes and causes a direct current component to flow through the power lines 300, 301 and 302. Three direct current responsive circuits 312, each of which may be similar to one of the circuits previously described, are connected in the respective power lines 300, 301 and 302. A latch-in relay 313 is also connected in each power line 300, 301 and 302 and each relay is connected to be actuated by its associated circuit 312. Preferably, the movable members of the three relays 313 are connected together such that, when sufficient direct current flows through the coil of one relay to actuate it, all three relays will open. Thus, if any one of the three windings 305, 306 or 307 should become overheated, all three of the power lines 300, 301 and 302 will be opened.

FIG. 19 shows a three phase system similar to that shown in FIG. 18, and comprises an apparatus 315 including windings 316, 317 and 318, a power supply 320 including windings 321, 322 and 323, and three power lines 326, 327 and 328. A direct current source comprising a rectifier 329, a normally open temperature sensitive switch 331, and a resistor 332 is provided, these components being serially connected across the two windings 317 and 318 of the apparatus 315. The temperature sensitive switch is mounted adjacent the windings 316 to 318. This direct current source is the same as that shown in FIG. 14 except that in FIG. 14 the source is connected across a portion of one winding.

A direct current responsive circuit 333, which may be similar to one of the circuits previously described, is connected in the line 328, and it is connected to actuate a latch-in relay 334. The relay 334 preferably has a set of contacts in each power line 326 to 328, which are opened simultaneously when the switch 331 closes and causes direct current to flow through the power lines and the direct current responsive circuit 333. Since the temperature sensitive switch 331 is adjacent all three of the apparatus windings, heating of any one of them will heat the temperature sensitive switch to set up a direct current causing the relay 334 to open the power lines.

The system shown in FIG. 20 comprises an apparatus 336 including a winding 337, and an alternating current power supply 338 including a winding 339, the two windings 337 and 339 being connected by two power lines 341 and 342.

The direct current responsive means comprises a differential relay 343 including a current wniding 344 and a potential winding 346. The current winding 344 is connected in the power line 341 and the potential winding 346 is connected across the two power lines 341 and 342 in series with a variable resistor 347 and the secondary winding 348 of an equalizing transformer 349. The primary winding 351 of the transformer 349 is connected across the power lines 341 and 342 and induces a blocking voltage in the secondary winding 348 which prevents alternating current from flowing through the potential coil 346 and the resistor 347. The differential relay 343 also includes a movable member 352 and contacts 352a which are connected to control another relay 353. The contacts 252a are connected in series with a normally closed stop switch 354 and the coil 356 of the relay 353, the components 352a, 354 and 356 being connected across the two power lines 341 and 342. The relay 353 also includes contacts 357 which are connected in the power line 341 on the apparatus 336 side of the coil 356. Further, a normally open start switch 358 is connected in parallel with the contacts 352a and may be closed briefly in order to initially start operation of the system in the manner explained with regard to the FIG. 8.

Direct current is introduced into the system shown in FIG. 20 by means including a rectifier 361 and a winding 362 which are connected in the line 341 in series with the current coil 344 of the differential relay 343. The winding 362 is inductively coupled to the primary winding 351 of the equalizing transformer 349 and has a relatively low voltage induced in it which is rectified by the rectifier 361. The direct current component of this rectified voltage flows through the differential relay 343, the apparatus winding 337, and the power supply winding 339 and actuates the differential relay 343 when a dangerously high temperature occurs as previously explained with regard to FIG. 8 for example. A capacitor 363, which may be of the electrolytic type, is preferably shunted across the winding 362, the rectifier 361, and the current coil 344 in order to bypass nearly all of the alternating current from the power supply 338 around these three components.

The system shown in FIG. 20 has advantages because it includes a relatively simple method of supplying direct current, and, due to the capacity 363, the differential relay 343 may be constructed to be very sensitive to direct current because it does not have to be constructed to carry alternating current flowing through the apparatus 336.

FIG. 21 shows a system including a direct current source somewhat similar to that shown in FIG. 20, and a bridge circuit. The system of FIG. 21 comprises an apparatus 366 including a winding 367, a power supply 368 including a winding 369, the two windings 367 and 369 being connected by two power lines 371 and 372. The apparatus winding 367 forms one arm of the bridge circuit, three resistors 373, 374 and 375 forming the other three arms of the bridge circuit. The resistor 373 is connected in the line 371 and the two resistors 374 and 375 are connected in series across the two power lines 371 and 372 and in series with the secondary winding 377 of an equalizing transformer 378. The primary winding 379 of the equalizing transformer 378 induces a blocking voltage in the secondary winding 377 which prevents the flow of alternating current through the resistors 374 and 375.

The direct current source includes a rectifier 381 and a winding 382 which are connected in the power line 371, the winding 382 being inductively coupled to the primary winding 379 of the equalizing transformer 378. Again, a capacitor 383 is preferably shunted across the rectifier 381 and the winding 382 in order to bypass alternating current. If desired, another capacitor 384 may be shunted across the resistor 373 in order to bypass alternating current around this resistor 373.

In operation the direct current source including the rectifier 381 and the winding 382 causes direct current to flow in the system, and a galvanometer 386 connected in the bridge circuit indicates any resistance unbalance existing. As in the case of the other systems including a bridge circuit, the resistor 375 may be made variable so that the bridge will reach a balanced condition only when the temperature of the apparatus winding 367 reaches an unsafe level. In this manner, the system works on a null basis and therefore is not affected by changes in the amount of direct current flowing through the system.

The system shown in FIG. 22 comprises an apparatus 388 including a winding 389 which is connected by two power lines 391 and 392 to the winding 393 of a power supply 394. A direct current source is connected in the power line 391 and comprises a rectifier 396, a transformer 397 and an auxiliary alternating current source 398. The rectifier 396 and the secondary winding 399 of the transformer 397 are connected in series in the power line 391, and the primary winding 401 of the transformer 397 is connected to the output of the alternating current source 398 and induces a voltage in the secondary winding 399. The induced voltage is rectified by the rectifier 396 and the direct current component flows through the power lines 391 and 392 and through the windings 389 and 393. Preferably a capacitor 402 is shunted across the rectifier 396 and the secondary winding 399 in order to prevent alternating current from flowing through.

The system further includes direct current responsive means comprising a relay 403 having a coil 404 and contacts 406. The coil 404 is connected in the power line 391, and this relay 403 is sensitive only to direct current flowing through the system. The capacitor 402 is preferably also shunted around the coil 404 so that the coil 404 can be made very sensitive since it does not have to carry the major portion of the alternating current. The contacts 406 of the relay 403 are connected across the power lines 391 and 392 in series with the coil 407 of another relay 408, the relay 408 further including contacts 409 which are connected in the power line 391 ahead of its coil 407. Further, a normally open manually operated start switch 411 is connected in parallel with the contacts 409 of the relay 408 in order to start operation of the system.

In operation, the start switch 411 is momentarily closed and permits alternating current from the supply 394 to flow through the power lines 391 and 392, the capacitor 402 and the apparatus winding 389. Alternating current from the source 398 causes a voltage to be induced in the secondary winding 399 of the transformer 397 which is rectified by the rectifier 396 and also flows through the system including the coil 404 and the winding 389. Direct current flowing through the coil 404 causes the relay 403 to close and energize the relay 408 which also closes, after which the start button 411 may be released. Operation of the system will then continue until the temperature of the apparatus winding 389 rises to an unsafe level, at which level the amount of direct current flowing in the system falls off due to the increased resistance of the winding 389. When the amount of direct current flowing is sufficiently low, the relay 403 opens and deenergizes the relay 408 which in turn opens the power line 391.

In a number of the systems described herein, the direct current responsive means includes one portion connected in series with the apparatus winding (in the direct current circuit) and another portion shunted across the apparatus winding. Thus one portion responds to direct current flowing through the apparatus winding and the other portion responds to the direct current voltage drop across the apparatus winding, and means is also provided to compare these two factors. It should be apparent that other means may be provided for making such a comparison, such as a magnetic amplifier.

A number of different methods of producing direct current are described herein, including a battery and the various circuits illustrated in the drawings. In many cases, a direct current source for a system shown in one figure of the drawings may be substituted for the direct current source of a system shown in another figure.

It is preferred that the systems shown in FIGS. 1, 8, 9, 10, 11, 12, 15, 16, 20 and 21 be operated on a null basis, so that the direct current sources used with these systems need not be constant voltage types. If they are not operated on a null basis, it is preferred that the direct current sources be of the constant voltage type. It is preferred that the systems shown in FIGS. 13 and 22 also be of the constant voltage type. The systems shown in FIGS. 14, 17, 18 and 19 respond to the existance of direct current in the systems and are relatively insensitive to the amount of direct current flowing.

From the foregoing, it is apparent that novel means has been provided for either protecting an alternating current apparatus, measuring its resistance and temperature, or both, while the apparatus is energized by alternating current. The circuits described are advantageous because they are accurate and reliable, and may be kept in operation continuously without the requirement of relatively large and expensive components.

I claim:

1. A detecting circuit responsive to the temperature of alternating current apparatus when energized by alternating current, the apparatus being connected by at least two conductors to an alternating current power supply, said circuit comprising means for causing direct current to be superimposed upon at least a portion of the power circuit of said apparatus in which alternating current flows and at least a portion of one of said two conductors in which alternating current is flowing, the flow of direct current depending upon the resistance and the temperature of the apparatus, and direct current responsive means having at least a portion serially connected in said portion of said one conductor, whereby said superimposed direct current flowing through a portion of said power circuit and a portion of said one conductor also flows through said portion of said direct current responsive means and is detected thereby.

2. A detecting circuit as in claim 1, wherein said portion of said direct current responsive means comprises a relay.

3. A detecting circuit as in claim 1, wherein said means for causing direct current is connected in one of said two conductors and in series with said portion of said direct current responsive means.

4. A detecting circuit responsive to the temperature of energized alternating current apparatus, the apparatus being connected by at least two conductors to an alternating current power supply, said circuit comprising means for causing direct current to flow through at least a portion of said apparatus and at least a portion of one of said two conductors, the flow of direct current depending upon the temperature of the apparatus, and direct current responsive means having at least a first portion serially connected in said portion of said one conductor, and a second portion connected to be responsive to a direct current voltage drop across said portion of said apparatus, whereby direct current flowing through said portion of said apparatus is detected by said portions of said direct current responsive means.

5. A detecting circuit as in claim 4, wherein said direct current responsive means comprises a differential relay including a current winding and a potential winding, said current winding comprising said first portion and said potential winding comprising said second portion of said direct current responsive means.

6. A detecting circuit as in claim 4, wherein said first portion of said direct current responsive means comprises one arm of a bridge circuit, and said second portion comprises two arms of said bridge circuit, the apparatus forming the fourth arm of said bridge circuit.

7. A detecting circuit as in claim 4, wherein said means for causing direct current to flow has one portion connected in one of said two conductors in series with said first portion of said direct current responsive means, and a second portion connected across said two conductors.

8. A detecting circuit as in claim 5, wherein said differential relay is connected to open at least one of said two conductors when the temperature of the apparatus rises to a predetermined level.

9. A detecting circuit as in claim 8, wherein said differential relay disconnects said conductor when the torque of said current winding is substantially equal to the torque of said potential winding.

10. A detecting circuit as in claim 6, wherein said bridge circuit is unbalanced when the temperature of the apparatus is at a relatively low level and said bridge becomes balanced when the temperature of the apparatus rises to a predetermined level.

11. A circuit responsive to the temperature and resistance of energized alternating current apparatus, the apparatus being connected by at least two power lines to an alternating current power supply, said circuit comprising means for causing direct current to flow through the alternating current power supply, the apparatus, and the power lines, the direct current flowing being related to the resistance and the temperature of the apparatus, and direct current responsive means connected to at least one of said power lines for detecting the direct current flowing through the apparatus.

12. A detecting circuit responsive to the temperature of energized alternating current apparatus, the apparatus being connected by a plurality of power lines to an alternating current power supply, said detecting circuit comprising means for causing direct current to flow through the apparatus, the flow of direct current depending upon the temperature of the apparatus, and direct current responsive means for detecting the flow of direct current through the apparatus, said direct current responsive means comprising differential means including a current member, a potential member, and a movable member, said current member being connected in one of said power lines and exerting a first force of said movable member which is representative of the amount of direct current flowing through the apparatus, and said potential member being connected across at least a portion of the apparatus and exerting a second force on said movable member which is representative of the direct current voltage drop across said apparatus, said forces being in opposite directions, the position of said movable member thereby being representative of the resistance and temperature of said apparatus.

13. A circuit as in claim 12, and further including means responsive to the position of said movable member for opening at least one of said power lines when the force exerted by said potential member attains a predetermined value relative to the value of the force exerted by said current member.

14. A detecting circuit responsive to the temperature of energized alternating current apparatus, the apparatus being connected by a plurality of power lines to an alternating current power supply, said detecting circuit comprising means for causing direct current to flow through the apparatus, the flow of direct current depending upon the temperature of the apparatus, and direct current responsive means for detecting the flow of direct current through the apparatus, said direct current responsive means comprising a differential relay including a current coil, a potential coil, and a movable member, said current coil being connected in one of said power lines and exerting a force in one direction on said member which is representative of the amount of direct current flowing through said apparatus, and said potential coil being connected across at least a portion of said apparatus and exerting a force in the other direction which is representative of the direct current voltage drop across said portion of said apparatus, the position of said member being indicative of the forces exerted by said current and potential coils and hence the resistance of said apparatus.

15. A circuit as in claim 14, wherein said differential relay includes normally open relay contacts adapted to be actuated by said movable member, and a normally open relay connected in one of the power lines, said relay contacts controlling energization of said normally open relay.

16. A circuit as in claim 14, wherein three power lines connect the alternating current apparatus to the power supply, and further including a second relay having three sets of normally open contacts connected in the respective power lines, said member controlling energization of said second relay.

17. A detecting circuit responsive to the temperature of energized alternating current apparatus, the apparatus being connected by a plurality of power lines to an alternating current power supply, said detecting circuit comprising means for causing direct current to flow through the apparatus, the flow of direct current depending upon the temperature of the apparatus, and direct current responsive means for detecting the flow of direct current through the apparatus, said direct current responsive means comprising a first resistor connected in series with said apparatus, second and third resistors connected in series with each other, said second and third resistors being connected across the power lines in parallel with said first resistor and the apparatus, said apparatus and said three resistors forming four arms of a bridge, and means connected between the junction of the apparatus and the first resistor and the junction of said second and third resistors for indicating the condition of said bridge.

18. A circuit as in claim 17 wherein the direct current resistance of said first resistor is small in comparison with the direct current resistance of the apparatus, and the direct current resistances of said second and third resistors are large in comparison with the direct current resistance of the apparatus.

19. A circuit as in claim 17, wherein said means for indicating the condition of said bridge comprises a first relay having its coil connected between said junctions, and a second relay having its contacts connected in one of the power lines, the coil of said second relay being connected in series with the contacts of said first relay and connected across the two power lines, said first and second relays being normally open types, and the values of the resistance of said first, second and third resistors being such that the bridge is unbalanced at normal operating temperatures of the apparatus and approaches a balanced condition as the temperature and the resistance of the apparatus increases.

20. A detecting circuit responsive to the temperature of energized alternating current apparatus, the apparatus being connected by a plurality of power lines to an alternating current power supply, said detecting circuit comprising means for causing direct current to flow through the apparatus, the flow of direct current depending upon the temperature of the apparatus, and direct current responsive means for detecting the flow of direct current through the apparatus, said direct current responsive means comprising a relay having its coil connected to be energized by said direct current, and its contacts connected to open at least one of said power lines and thereby disconnect the alternating current power supply from the apparatus at a predetermined value of direct current.

21. A detecting circuit responsive to the temperature of energized alternating current apparatus, the apparatus being connected by a plurality of power lines to an alternating current power supply, said detecting circuit comprising means for causing direct current to flow through the apparatus, the flow of direct current depending upon the temperature of the apparatus, and direct current responsive means for detecting the flow of direct current through the apparatus, said direct current responsive means comprising a resistor connected in one of the power lines, a relay having a coil and normally closed contacts, said coil being connected in parallel with said resistor and said contacts being connected in one of the power lines, and an equalizing transformer having a primary winding and a secondary winding, said secondary winding being connected in series with said relay coil and said primary winding being connected in parallel with said resistor and adapted to induce in said secondary winding a voltage equal to and 180° out of phase with the alternating current voltage drop across said resistor, whereby only direct current flows through said relay coil.

22. A circuit as in claim 21, wherein said direct current means comprises a rectifier and a temperature sensitive resistor connected in series, said rectifier and said resistor being connected in parallel with at least a portion of the apparatus, and said resistor being positioned to be heated by the apparatus, the resistance of said resistor decreasing and permitting a substantial direct current to flow when it is heated.

23. A detecting circuit responsive to the temperature of energized alternating current apparatus, the apparatus being connected by a plurality of power lines to an alternating current power supply, said detecting circuit comprising means for causing direct current to flow through the apparatus, the flow of direct current depending upon the temperature of the apparatus, and direct current responsive means for detecting the flow of direct current through the apparatus, said direct current responsive means comprising a first relay having a coil and contacts, said first relay being sensitive to direct current only and said coil being connected in one of the power lines, and said contacts being adapted to open one of the power lines when direct current flows through said coil, and said means for causing flow of direct current is adapted to cause direct current to flow through the power lines and the coil only when the temperature and hence the resistance of the apparatus rises above a predetermined level.

24. A circuit as in claim 23, wherein said means for causing flow of direct current comprises a normally open temperature sensitive switch, a rectifier, and a resistor serially connected across at least a portion of the apparatus, said switch closing at said predetermined temperature level.

25. A circuit as in claim 23, wherein said direct current responsive means further includes a second relay having a coil and normally open contacts, the contacts of said first mentioned relay controlling energization of said coil of said second relay, and said contacts of said second relay being in one of the power lines.

26. A detecting circuit responsive to the temperature of energized alternating current apparatus, the apparatus being connected by a plurality of power lines to an alternating current power supply, said detecting circuit comprising means for causing direct current to flow through the apparatus, the flow of direct current depending upon the temperature of the apparatus, and direct current responsive means for detecting the flow of direct current through the apparatus, the apparatus and the power supply each including first, second and third phase windings, and the apparatus and the power supply being connected by three power supply lines, and said direct current responsive means comprising a first resistor connected in series with said first winding of the apparatus, and second and third resistors serially connected across said first and second apparatus windings, said three resistors forming with said first and second apparatus windings a bridge, and a meter connected in said bridge for indicating the condition of said bridge.

27. A detecting circuit responsive to the temperature of energized alternating current apparatus, the apparatus being connected by a plurality of power lines to an alternating current power supply, said detecting circuit comprising means for causing direct current to flow through the apparatus, the flow of direct current depending upon the temperature of the apparatus, and direct current responsive means for detecting the flow of direct current through the apparatus, the apparatus and the power supply each including three phase windings, and the windings of the apparatus being connected to the windings of the power supply by three power lines, and said direct current responsive means comprising a relay having contacts connected in at least one of the power lines, and a relay control circuit connected in at least one of said power lines and controlling energization of said relay in response to direct current flow in said power lines.

28. A circuit as in claim 27, wherein said direct current means comprises three rectifiers and three normally open temperature sensitive switches serially connected across at least a portion of the respective apparatus windings.

29. A circuit as in claim 27, wherein said direct current means comprises a normally open temperature sensitive switch, a rectifier, and a resistor serially connected across two of said apparatus windings.

30. A circuit responsive to the temperature and resistance of energized alternating current apparatus, the apparatus including three windings and being connected by three power lines to three windings of a polyphase power supply, said circuit comprising means for causing direct current to flow through two of said windings of said power supply, two of said windings of said apparatus, and two of said power lines, the amount of direct current flowing being a function of the resistance and the temperature of the apparatus, direct current responsive means connected to one of said two power lines for detecting the direct current flowing through said two windings of the apparatus, and a relay responsive to the detection of direct current by said direct current responsive means, said relay having contacts in each of said three power lines for opening said three power lines when said relay is energized.

31. A circuit responsive to the temperature and resistance of energized alternating current apparatus, the apparatus including first, second and third windings and being connected by first, second and third power lines to a polyphase power supply, said circuit comprising a pair of branches, one of said branches comprising means for causing direct current to flow through the power supply, the first and second power lines, and the first and second windings of the apparatus, the amount of direct current flowing being a function of the resistance and the temperature of the first and second windings of the apparatus, and direct current responsive means connected to at least one of the first and second power lines for detecting the direct current flowing through the first and second apparatus windings, and the other of said pair of branches comprising means for causing direct current to flow through the power supply, the second and third power lines, and the second and third winding of the apparatus, the amount of direct current flowing being a function of the resistance and the temperature of the second and third windings of the apparatus, and direct current responsive means connected to at least one of the second and third power lines for detecting the direct current flowing through the second and third apparatus windings.

32. A circuit responsive to the temperature and resistance of energized alternating current apparatus, the apparatus being connected by at least two power lines to an alternating current power supply, said circuit comprising means for causing direct current to flow through the apparatus and the power lines, means adapted to be connected in one of the power lines and exert a force that is proportional to the amount of direct current flowing through the apparatus, means adapted to be connected across at least a portion of the apparatus and exert a force that is proportional to the direct current voltage drop across said portion of the apparatus, and means having a variable condition and responsive to said forces to change said condition as the temperature and hence the resistance of the apparatus change.

33. Means for converting a portion of alternating current flowing in a conductor to direct current, comprising three rectifiers connected in two parallel branches, said parallel branches being adapted to be connected in said conductor, two of said rectifiers being serially connected in one of said two branches to pass current in one direction and the third rectifier being connected in the other of said two branches to pass current in the other direction, and the forward resistance of said two rectifiers being greater than the forward resistance of said third rectifier.

34. Means for converting a portion of alternating current flowing in a conductor to direct current, comprising a rectifier and an impedance connected in two parallel branches, said parallel branches being adapted to be connected in said conductor, said impedance being connected in one of said two branches and the said rectifier being connected in the other of said two branches, said impedance being different from the forward resistance of said rectifier.

35. Means for converting a portion of alternating current flowing in an apparatus winding to direct current, comprising a rectifier and a temperature sensitive element serially connected across at least a portion of said apparatus winding, said element being positioned to be heated by said apparatus winding, said element having high resistance to direct current flow at low temperatures and low resistance to direct current flow at high temperatures.

36. A circuit as in claim 35, wherein said element comprises a temperature sensitive switch which is open at normal temperatures and closes at relatively high temperatures.

37. A circuit as in claim 35, wherein said element comprises a thermistor which has relatively high resistance at normal temperatures and relatively low resistance at high temperatures.

38. Means for converting a portion of alternating current flowing in a conductor to direct current, comprising a rectifier, a capacitor, and a transformer having primary and secondary windings, said capacitor being connected in one of said two parallel branches and said rectifier and said secondary winding being serially connected in the other of said two parallel branches, said two parallel branches being adapted to be connected in said conductor, and said primary winding being adapted to be connected to an alternating current voltage.

39. A circuit responsive to the temperature of energized alternating current apparatus, the apparatus being connected to an alternating current power supply by a plurality of power lines, comprising a differential relay including current and potential coils, an equalizing transformer including primary and secondary windings, said current coil being connected in one of said power lines, said potential coil and said secondary winding being serially connected across two of said power lines, and means for generating direct current in said circuit comprising a rectifier and an auxiliary secondary winding serially connected in one of said power lines, and a capacitor connected in parallel with said rectifier and said auxiliary secondary winding, said secondary winding and said auxiliary secondary winding being adapted to have voltages induced therein, and said differential relay being adapted to be actuated when the temperature of the apparatus reaches a predetermined level.

40. A circuit responsive to the temperature of energized alternating current apparatus, the apparatus being connected to an alternating current power supply by a plurality of power lines, comprising a first resistor connected in one of said power lines, second and third resistors serially connected across two of said power lines, an equalizing transformer including primary and secondary windings, said secondary winding being connected in series with said second and third resistors, and means for generating direct current in said circuit comprising a rectifier and an auxiliary secondary winding serially connected in one of said power lines, and a capacitor connected in parallel with said rectifier and said auxiliary secondary winding, said secondary winding and said auxiliary secondary winding being adapted to have voltages induced therein.

41. A circuit responsive to the temperature of energized alternating current apparatus, the apparatus being connected to an alternating current power supply by a plurality of power lines, comprising a direct current responsive relay including a coil connected in one of said power lines, and means for generating direct current in said circuit comprising a rectifier and an auxiliary secondary winding serially connected in one of said power lines, and a capacitor connected in parallel with said rectifier and said auxiliary secondary winding, a primary winding for inducing a voltage in said auxiliary secondary winding, said primary winding being adapted to be connected to an auxiliary alternating current supply.

42. In an electrical circuit having alternating current flowing therethrough, converting means for converting alternating current to direct current comprising two parallel branches adapted to be connected in said circuit, first electrical component means connected in one of said branches and permitting alternating current to flow through said one branch for not more than one-half of each cycle, and second electrical component means connected in the other of said branches and permitting alternating current to flow through said other branch for at least one-half of each cycle, said first and second electrical component means presenting different impedances to the flow of alternating current, whereby an alternating current flowing through said one branch is converted to direct current.

43. The combination of claim 42, wherein said first electrical component means comprises a rectifier and said second electrical component means comprises an alternating current impedance permitting alternating current to flow therethrough for all of each cycle.

44. The combination of claim 42, wherein said circuit includes an energized alternating current apparatus, and said second electrical component means comprises at least a portion of said apparatus.

45. The combination of claim 42, wherein the alternating current flowing through said circuit also flows through at least one of said branches.

46. The combination of claim 42, wherein the alternating current flowing through said circuit is provided by a main power supply and the alternating current flowing through said one branch is provided by an auxiliary power supply.

47. In an electrical circuit having alternating current flowing therethrough, converting means for converting alternating current to direct current comprising two parallel branches adapted to be connected in said circuit, a rectifier and a winding connected in series in one of said two branches, means for inducing an alternating current voltage in said winding, and a capacitor connected in the other of said branches, whereby alternating current induced in said winding is rectified and flows through said circuit.

48. A detecting circuit responsive to the temperature of alternating current apparatus, the apparatus being connected by at least two conductors to an alternating current power supply, said circuit comprising converting means for converting alternating current to direct current comprising two parallel branches adapted to be connected in said circuit, first electrical component means connected in one of said branches and permitting alternating current to flow through said one branch for not more than one-half of each cycle, and second electrical component means connected in the other of said branches and permitting alternating current to flow through said other branch for at least one-half of each cycle, said first and second component means presenting different impedances to the flow of alternating current, whereby an alternating current flowing through said one branch is converted to direct current, and detecting means connected in series with said converting means, said detecting means being responsive to said rectified alternating current.

References Cited

UNITED STATES PATENTS

| | | | |
|---|---|---|---|
| 2,504,827 | 4/1950 | Goldsborough | 317—32 X |
| 3,155,879 | 11/1964 | Casey et al. | 317—33 |

MILTON O. HIRSHFIELD, *Primary Examiner.*

R. V. LUPO, *Assistant Examiner.*